United States Patent
Ui et al.

(10) Patent No.: US 10,543,762 B2
(45) Date of Patent: Jan. 28, 2020

(54) VEHICLE SEAT AIR-BLOWING APPARATUS AND VEHICLE SEAT

(71) Applicant: TOYOTA BOSHOKU KABUSHIKI KAISHA, Aichi-ken (JP)

(72) Inventors: Shuichi Ui, Aichi-ken (JP); Yuya Makino, Aichi-ken (JP); Atsushi Tsuzaki, Aichi-ken (JP); Hiroshi Murahata, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 57 days.

(21) Appl. No.: 15/796,150

(22) Filed: Oct. 27, 2017

(65) Prior Publication Data
US 2018/0126881 A1 May 10, 2018

(30) Foreign Application Priority Data

Nov. 8, 2016 (JP) .................... 2016-218044

(51) Int. Cl.
*B60N 2/56* (2006.01)
*B60N 2/58* (2006.01)

(52) U.S. Cl.
CPC ......... *B60N 2/5657* (2013.01); *B60N 2/5642* (2013.01); *B60N 2/58* (2013.01)

(58) Field of Classification Search
CPC ...... B60N 2/5657; B60N 2/5642; B60N 2/58; B60N 2/56; B60N 2/5621; B60H 1/00285;

(Continued)

(56) References Cited

U.S. PATENT DOCUMENTS 3,030,145 A * 4/1962 Kottemann .......... B60N 2/5635
                                                         297/180.11
5,927,817 A * 7/1999 Ekman .................... B60N 2/56
                                                         297/180.14

(Continued)

FOREIGN PATENT DOCUMENTS

CN        102019866        4/2011
CN        102729865        10/2012

(Continued)

OTHER PUBLICATIONS

Chinese Office Action of corresponding Chinese patent application No. 201711090638.9, dated Sep. 16, 2019, along with English translation.

*Primary Examiner* — Mark R Wendell
(74) *Attorney, Agent, or Firm* — Greenblum & Bernstein, P.L.C.

(57) ABSTRACT

A vehicle seat air-blowing apparatus including an air blower including an impeller configured to generate air flow and an air blower opening configured to allow the air flow to flow in a ventilation passage of a seat pad of a vehicle seat, and a cover provided to the air blower opening and including a cover ventilation opening configured to allow the air flow to flow therethrough and a protection part configured to suppress application of a load to the air blower opening, wherein the vehicle seat air-blowing apparatus is configured to be attachable to the vehicle seat along the seat pad at a position where an opening of the ventilation passage provided in a rear surface of the seat pad and the cover ventilation opening of the cover face each other.

9 Claims, 7 Drawing Sheets

(58) Field of Classification Search
CPC .............. B60H 1/0055; B60H 1/00521; B60H 2001/006
USPC ............... 297/180.1, 180.14, 180.11, 180.13
See application file for complete search history.

(56) References Cited

U.S. PATENT DOCUMENTS

| | | | | |
|---|---|---|---|---|
| 6,048,024 | A * | 4/2000 | Wallman | A47C 7/74 297/180.14 |
| 6,478,369 | B1 * | 11/2002 | Aoki | B60H 1/00271 297/180.1 |
| 8,998,311 | B2 * | 4/2015 | Axakov | B60N 2/5635 297/180.13 |
| 9,061,617 | B2 | 6/2015 | Axakov et al. | |
| 2006/0138812 | A1 * | 6/2006 | Aoki | B60N 2/5635 297/180.14 |
| 2010/0209230 | A1 * | 8/2010 | Eckel | B60H 1/00285 415/119 |
| 2011/0061400 | A1 | 3/2011 | Park et al. | |
| 2012/0256450 | A1 | 10/2012 | Sahashi | |
| 2012/0256451 | A1 | 10/2012 | Sahashi | |
| 2015/0274049 | A1 * | 10/2015 | Langensiepen | B60N 2/5628 297/180.12 |
| 2015/0329027 | A1 * | 11/2015 | Axakov | B60N 2/565 297/180.13 |
| 2016/0137110 | A1 * | 5/2016 | Lofy | B60N 2/5635 62/3.3 |
| 2016/0272038 | A1 | 9/2016 | Tanaka et al. | |
| 2016/0332549 | A1 * | 11/2016 | Marquette | B60N 2/5657 |
| 2017/0181225 | A1 | 6/2017 | Inaba et al. | |
| 2018/0020838 | A1 * | 1/2018 | Ishii | B60N 2/90 297/180.13 |
| 2019/0230744 | A1 | 7/2019 | Inaba et al. | |
| 2019/0239289 | A1 | 8/2019 | Inaba et al. | |

FOREIGN PATENT DOCUMENTS

| | | |
|---|---|---|
| CN | 204774814 | 11/2015 |
| CN | 105682956 | 6/2016 |
| CN | 106028874 | 10/2016 |
| JP | 2016-055783 | 4/2016 |

* cited by examiner

VEHICLE SEAT AIR-BLOWING APPARATUS AND VEHICLE SEAT

CROSS-REFERENCE TO RELATED APPLICATIONS

This application claims priority from Japanese Patent Application No. 2016-218044 filed on Nov. 8, 2017, the entire contents of which are incorporated herein by reference.

TECHNICAL FIELD

The present disclosure relates to a vehicle seat air-blowing apparatus circulating air in front and rear of a seat pad of a vehicle seat, and a vehicle seat including the air-blowing apparatus.

BACKGROUND

In JP-A-2016-55783, there is disclosed a configuration in which an air blower is disposed on a rear side of a seat pad forming a seat surface of a vehicle seat, and in which a ventilation passage formed inside the seat pad and the air blower are connected via a duct having a bellows-shaped pipeline. In JP-A-2016-55783, the duct connected to the ventilation passage of the seat pad and the air blower are disposed to be connected in a vertical direction.

As described in JP-A-2016-55783, a thickness of the entire air-blowing apparatus including the duct and the air blower increases when the duct and the air blower are disposed to be connected in a connected direction toward the seat pad. For this reason, there is a problem that a large space is required when the air blower is installed in a limited space of a rear side of the seat pad. There is also a problem that noises are likely to occur since smooth flowing of air is hindered due to unevenness of the bellows configuration provided in the duct.

SUMMARY

The present disclosure provides a vehicle seat air-blowing apparatus in which a duct interposed between a seat pad and an air blower is eliminated, and a vehicle seat including the air-blowing apparatus.

According to an aspect of the disclosure, there is provided a vehicle seat air-blowing apparatus configured to be attached to a vehicle seat including a seat pad which forms a supporting surface for supporting a body of an occupant and has a ventilation passage configured to allow air to flow therethrough and configured to cause the air to flow in the ventilation passage, the vehicle seat air-blowing apparatus including: an air blower including: an impeller configured to generate air flow; and an air blower opening configured to allow the air flow to flow in the ventilation passage; and a cover provided to the air blower opening and including: a cover ventilation opening configured to allow the air flow to flow therethrough; and a protection part configured to suppress application of a load to the air blower opening, wherein the vehicle seat air-blowing apparatus is configured to be attachable to the vehicle seat along the seat pad at a position where an opening of the ventilation passage provided in a rear surface of the seat pad and the cover ventilation opening of the cover face each other.

According to another aspect of the disclosure, there is provided a vehicle seat including: a seat pad which forms a supporting surface for supporting a body of an occupant and has a ventilation passage configured to allow air to flow therethrough; and an air-blowing apparatus which is configured to cause the air to flow in the ventilation passage, the air-blowing apparatus including: an air blower including: an impeller configured to generate air flow; and an air blower opening configured to allow the air flow to flow in the ventilation passage; and a cover provided to the air blower opening and including: a cover ventilation opening configured to allow the air flow to flow therethrough; and a protection part configured to suppress application of a load to the air blower opening, wherein the air-blowing apparatus is attached along the seat pad at a position where an opening of the ventilation passage provided in a rear surface of the seat pad and the cover ventilation opening face each other.

DETAILED DESCRIPTION

Hereinafter, embodiments of the present disclosure will be described with reference to drawings. Incidentally, the present disclosure is not limited to the following embodiments, and can be implemented in various modes. The embodiments apply a vehicle seat air-blowing apparatus and a vehicle seat including the air-blowing apparatus in the present disclosure to a seat used in a seat of an automobile or the like. In the embodiment, arrows showing upper, lower, front, rear, left, and right directions described in the figures are described for easier understanding of relationships among the figures. The present disclosure is not limited to the directions described in the figures.

Figure 1:
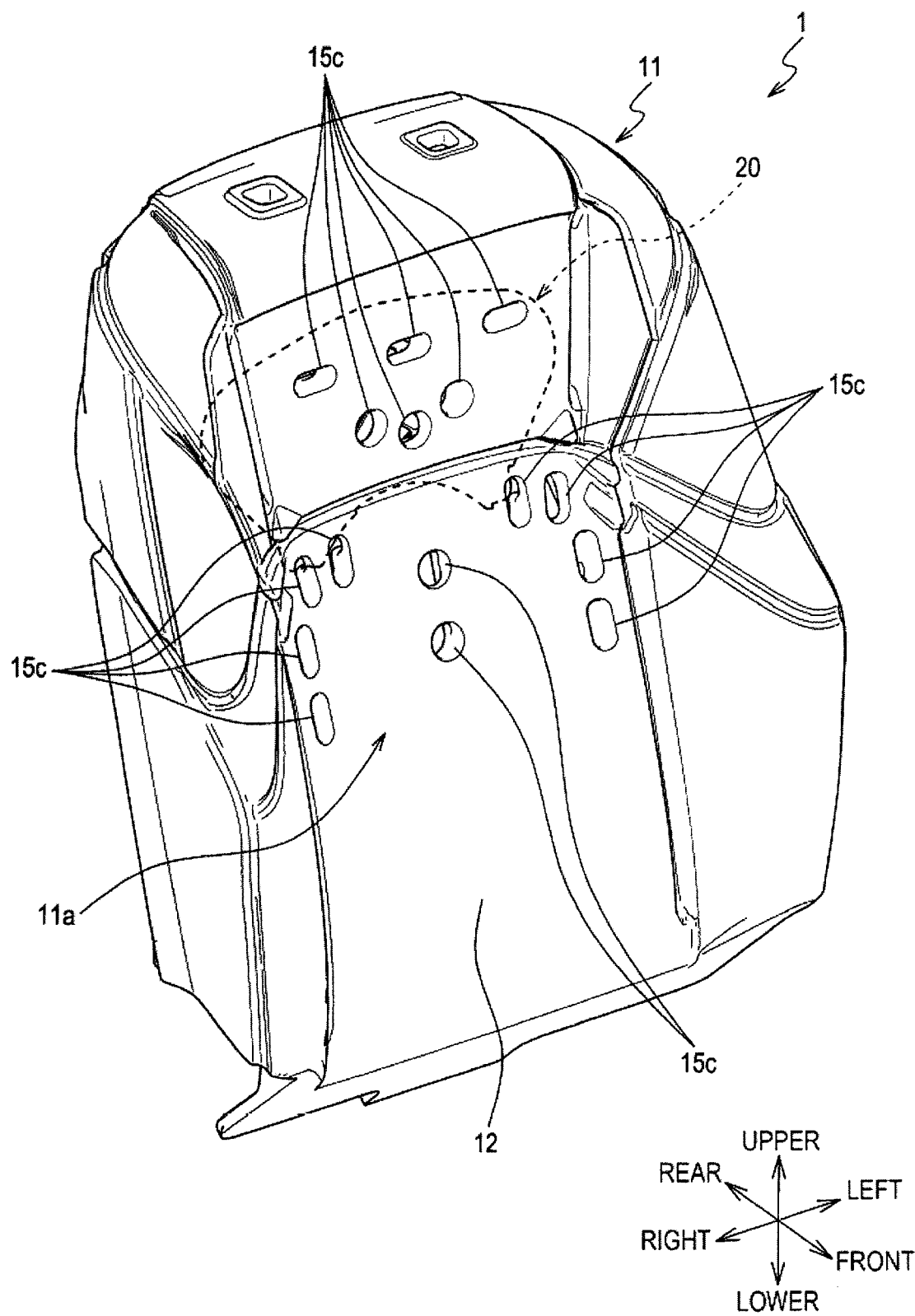
FIG. 1 is a perspective view of a seat back seen from a front side.
Figure 2:
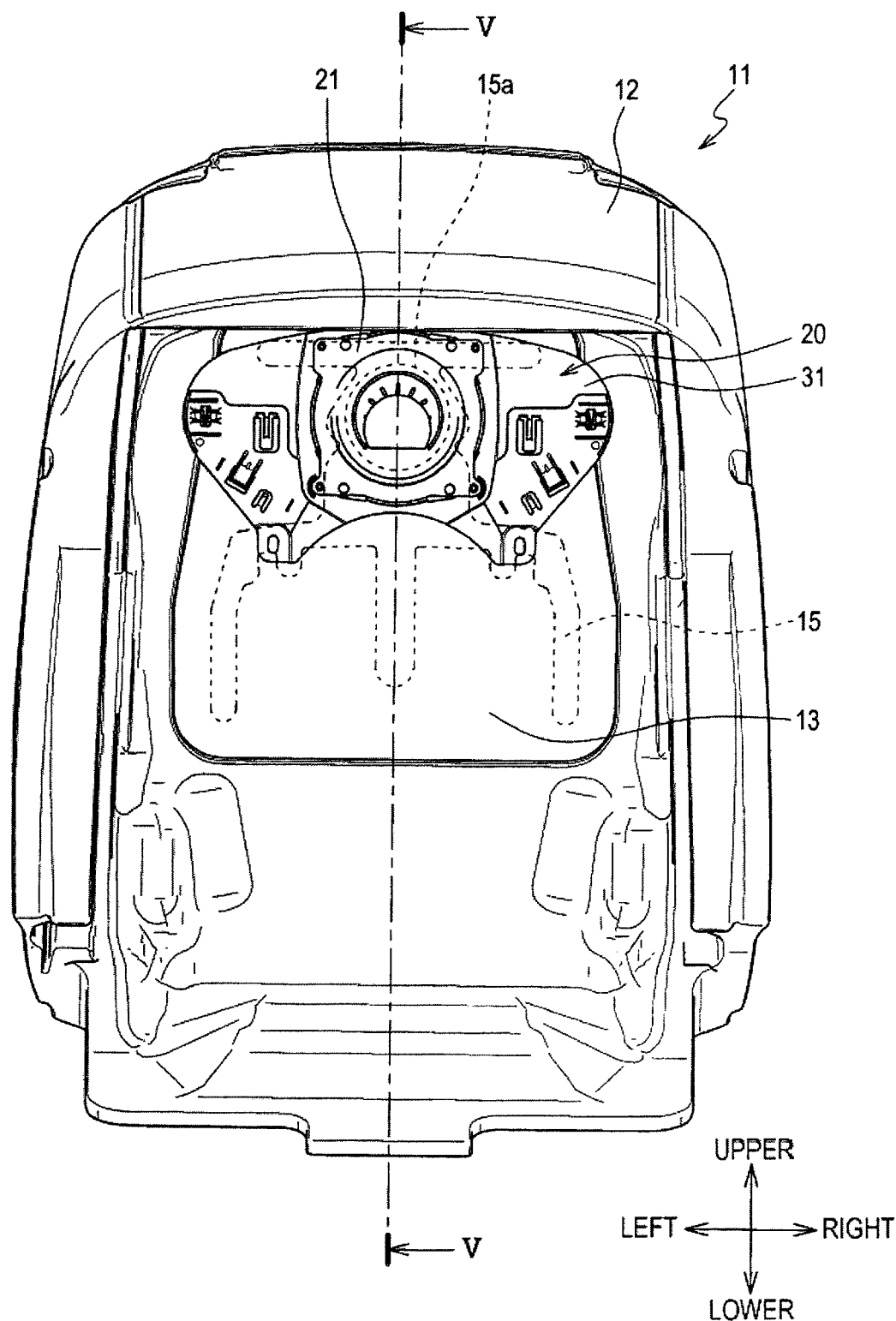
FIG. 2 is a rear view of an inner part of the seat back showing an arrangement situation of an air-blowing unit.

As shown in FIGS. 1 and 2, a seat 1 includes a seat back 11 for supporting a back of an occupant, a seat cushion (not shown) for supporting buttocks of the occupant, an air-blowing unit 20 disposed inside the seat back 11, and a headrest (not shown). The seat 1 includes an air-conditioning mechanism sucking air from a plurality of front side openings 15c provided on a backrest surface 11a formed by the seat back 11. Here, an embodiment of the present disclosure will be described by taking the seat back 11 as an example.

The seat back 11 includes a seat pad 12 made of a foamed urethane and functioning as a cushioning material. The seat pad 12 is a member which is covered on a back frame (not shown) forming a framework of the seat back 11 and which forms the backrest surface 11a. Hereinafter, a surface toward a front side of the seat pad 12 is referred to as a front surface, and a surface toward a rear side thereof is referred to as a rear surface.

As shown in FIG. 2, the air-blowing unit 20 is provided to an upper portion of a rear surface side of the seat pad 12. The air-blowing unit 20 corresponds to the vehicle seat air-blowing apparatus in the present disclosure. The air-blowing unit 20 includes an air blower 21 for generating air flow via a rotating impeller. The air-blowing unit 20 is mounted such that an air blower opening 24, which is an opening for the air blower 21 to suck air, faces the rear surface side of the seat pad 12.

In the rear surface of the seat pad 12, a ventilation passage 15 including a plurality of connected grooves widening and extending along the backrest surface 11a from a position facing the air blower opening 24 are formed. The ventilation passage 15 penetrates partially to the front surface of the seat pad 12 in a plurality of positions, such that air can pass between the front and rear surfaces of the seat pad 12.

Further, in a range where the ventilation passage 15 is formed in the rear surface of the seat pad 12, a seat pad rear cover 13 is affixed to cover an opening surface of the ventilation passage 15. The seat pad rear cover 13 is, for example, a thin-plated member made of hard felt. The opening surface of the ventilation passage 15 is blocked by the seat pad rear cover 13, so that air can flow along the grooves of the ventilation passage 15. Further, the seat pad rear cover 13 is provided with a ventilation passage opening part 15a, which is an opening for allowing air to flow therethrough, in a position directly facing the air blower opening 24, such that the air blower opening 24 and the ventilation passage 15 are connected via the ventilation passage opening part 15a. Therefore, the air-blowing unit 20 sucks air from the air blower opening 24, and accordingly air sucked from the front surface of the seat pad 12 can be discharged to the rear side thereof via the ventilation passage 15.

Figure 3:
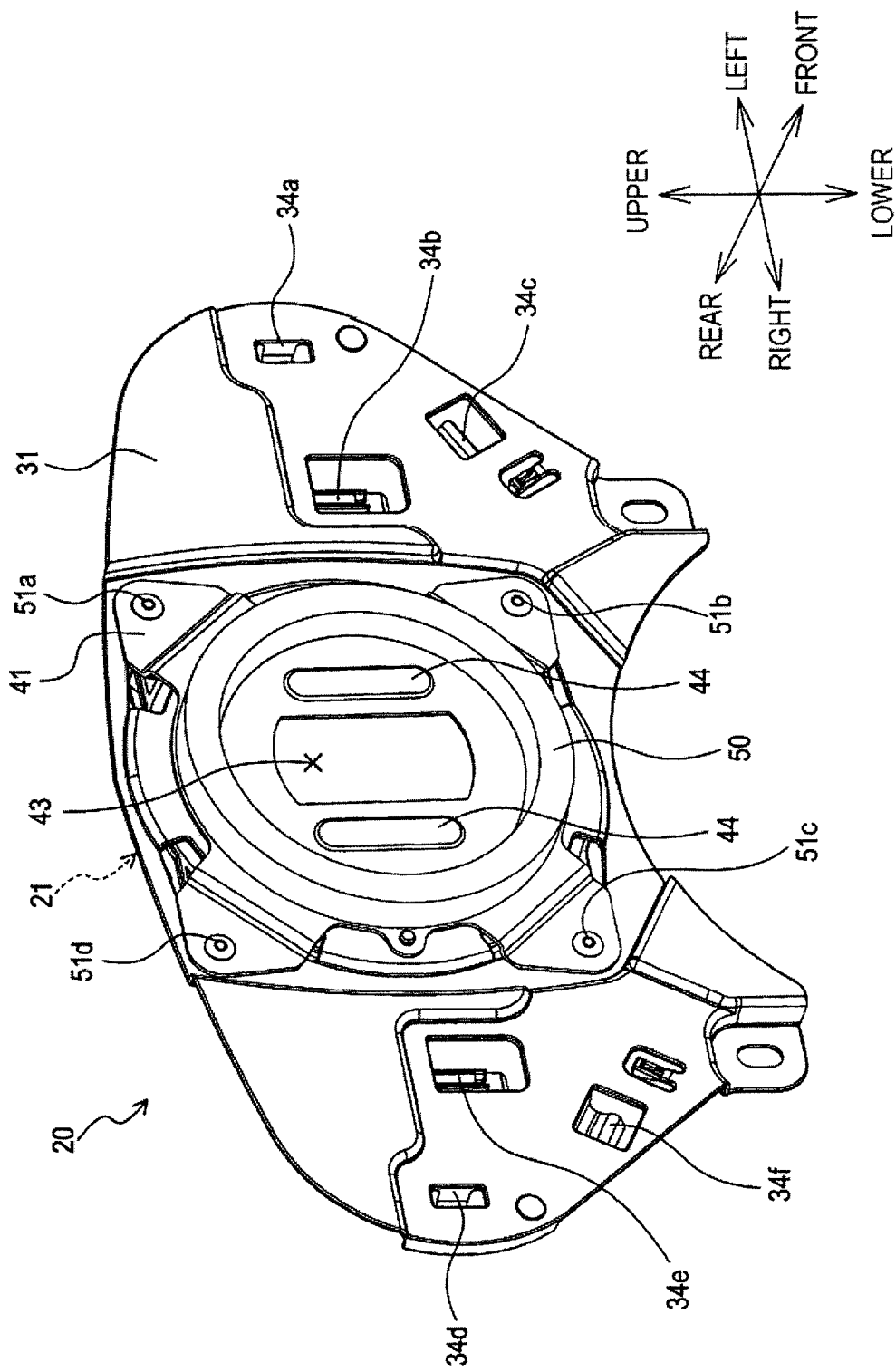
FIG. 3 is a perspective view of the air-blowing unit seen from a front side.
Figure 4:
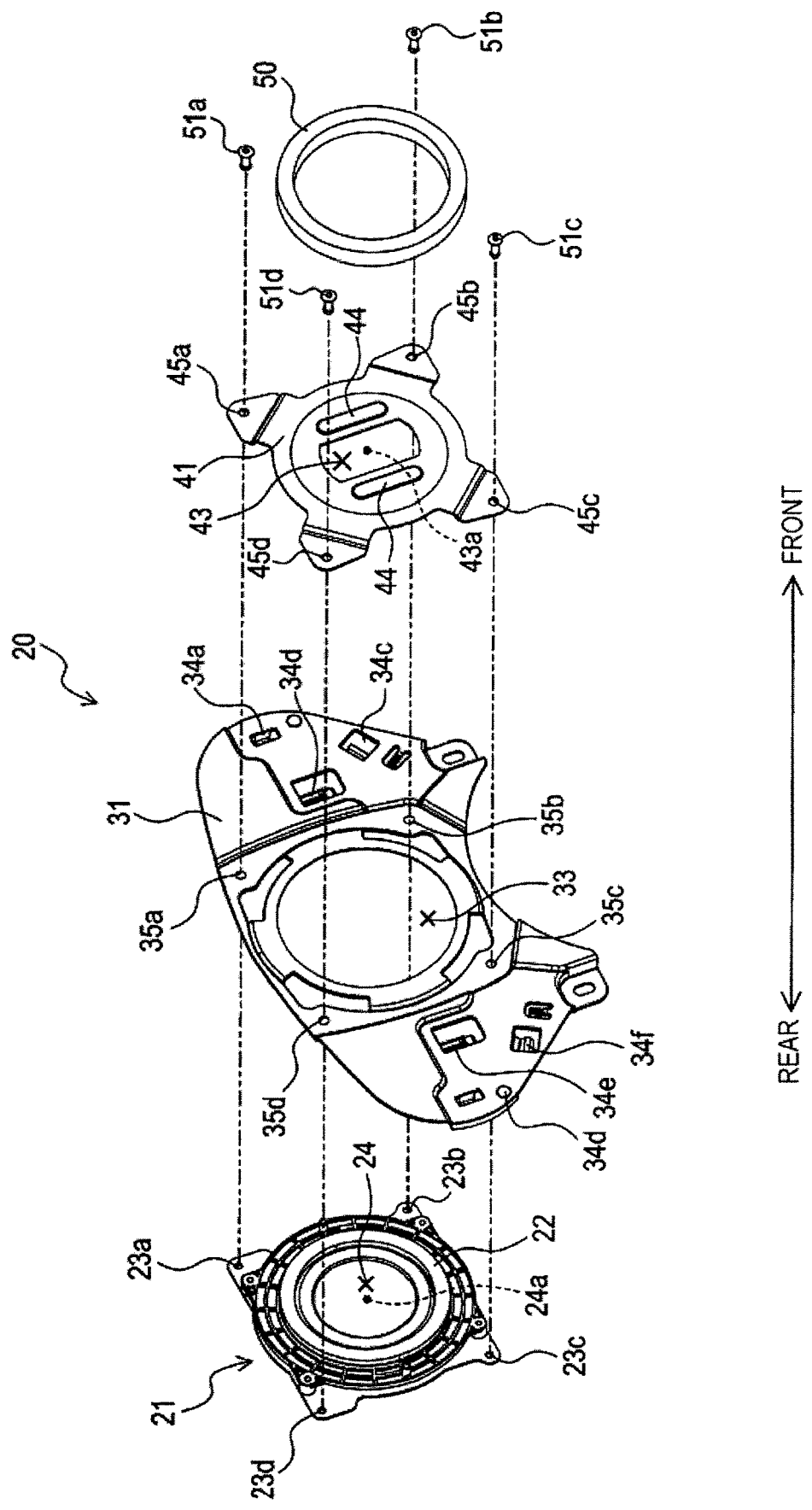
FIG. 4 is an extended view showing members constituting the air-blowing unit.

Next, a detailed configuration of the air-blowing unit 20 will be described with reference to FIGS. 3 and 4. As shown in FIGS. 3 and 4, the air-blowing unit 20 is configured such that the air blower 21, a mounting member 31, a cover plate 41, and a seal member 50 are superposed in a row.

The air blower 21 is a fan for generating air flows by rotating the impeller by a motor, and is provided in a most rear side of the air-blowing unit 20. In the embodiment, a centrifugal fan is used as the air blower 21, but other types of fans may be used. As shown in FIG. 4, the air blower 21 includes an air-blowing casing 22 which is an outer box accommodating the motor and the impeller (not shown). The impeller is accommodated in the air-blowing casing 22 in a direction where a rotation shaft is oriented in the front-and-rear direction and air is sucked from the front side of the air blower 21.

An air blower opening 24 is provided in a central part of a front side of the air-blowing casing 22, and is a circular opening taking the rotation axis of the impeller as a center thereof. Air is sucked from the air blower opening 24 and discharged from a discharging opening (not shown) provided on a rear side of the air-blowing casing 22. Also, four fastening holes 23a, 23b, 23c, and 23d are provided around the air blower opening 24. The fastening holes 23a to 23d are holes to which rivets 51a, 51b, 51c, and 51d, which are for fastening the air blower 21, the mounting member 31, and the cover plate 41 in a superposed state, are to be inserted. The fastening holes 23a to 23d are disposed at equal intervals in a circumferential direction taking the air blower opening 24 as a center.

The mounting member 31 is a plate-shaped member provided to be sandwiched between the air blower 21 and the cover plate 41, and extends horizontally along an in-plane direction of the air blower opening 24. The mounting member 31 is a member having a function of positioning and supporting the air-blowing unit 20 to a position facing an opening part of the ventilation passage 15 provided in the rear surface of the seat pad 12. The mounting member 31 is, for example, made of an elastic hard resin, and is configured to support the air-blowing unit 20 in a state of pressing the air-blowing unit 20 in a direction of the rear surface of the seat pad 12 via the elasticity thereof.

As shown in FIG. 4, a communication hole 33, which is a circular opening allowing the air blower opening 24 to be exposed toward a front direction thereof and air to flow therethrough, is provided in a central part of the mounting member 31. Around the communication hole 33, there are provided four fastening holes 35a, 35b, 35c, and 35d which are holes to which the rivets 51a to 51d are to be inserted. The fastening holes 35a to 35d are disposed in positions corresponding to the fastening holes 23a to 23d of the air blower 21, respectively.

In left and right sides of the mounting member 31, a plurality of engagement claws 34a, 34b, 34c, 34d, 34e, and 34f projecting toward a rear surface side (that is, the rear side) of the mounting member 31 are provided. The engagement claws 34a to 34f are disposed in positions corresponding to a back-frame-related member provided on a position where the air-blowing unit 20 is to be mounted. In this way, the air-blowing unit 20 is positioned and supported to a predetermined position by engaging each of the engagement claws 34a to 34f with the back-frame-related member.

The cover plate 41 is provided on the front side of the mounting member 31 and is a plate-shaped member covering the air blower opening 24 from the front side thereof. The cover plate 41 is a member having a function of protecting the air blower opening 24 while allowing air to flow therethrough. Here, such protection refers to, for example, suppressing a load applied to the air blower opening 24 from the front surface side of the seat pad 12 as well as entering of a foreign matter (for example, part of the seat pad 12) into the air blower opening 24. For this reason, the cover plate 41 is made of a material having high rigidity such as a metal.

As shown in FIGS. 3 and 4, a cover ventilation opening 43, which is an opening for allowing air to flow therethrough, is provided in a central part of the cover plate 41. The cover ventilation opening 43 is a substantially circular opening area as a whole which is opened to be matched with a circular area corresponding to a shape of the air blower opening 24. Also, a protection part 44 which has an elongated convex shape and is provided to a position sandwiching both sides of the cover ventilation opening 43 is provided on the central part of the cover plate 41. Separation of the seat pad 12 and the air blower opening 24 is ensured due to a thickness of the protection part 44, thereby suppressing the load applied toward the air blower opening 24 from the seat pad 12 as well as entering of the foreign matter into the air blower opening 24.

As shown in FIG. 4, four fastening holes 45a, 45b, 45c, and 45d which are holes to which the rivets 51a to 51d are to be inserted are provided around the cover ventilation opening 43 and the protection part 44. The fastening holes 45a to 45d are disposed in positions corresponding to the fastening holes 23a to 23d of the air blower 21, respectively.

The air blower 21, the mounting member 31, and the cover plate 41 are fastened integrally by the rivets 51a to 51f. Specifically, the air blower 21, the mounting member 31, and the cover plate 41 are superposed in this order by superposing the fastening holes 23a to 23d, the fastening holes 35a to 35d, and the fastening holes 45a to 45d on overlapping positions respectively, and the air blower 21, the mounting member 31, and the cover plate 41 are fastened by caulking shaft ends of the rivets 51a to 51d inserted into each of the fastening holes. Here, a center 24a of the air blower opening 24 and a center 43a of the cover ventilation opening 43a are positioned to be overlapped in the front-and-rear direction when the air blower 21, the mounting member 31, and the cover plate 41 are fastened. That is, the rotation axis of the impeller built in the air blower 21, the center 24a of the air blower opening 24, and the center 43a of the cover ventilation opening 43 are configured to be aligned in a straight line.

The seal member 50 is a seal member used to keep air tightness between the cover ventilation opening 43 and the ventilation passage opening part 15a, and is disposed in a foremost side of the air-blowing unit 20. The seal member 50 is, for example, made of a material having elasticity and air tightness such as synthetic resin foam such as flexible urethane foam and foamed rubber. The seal member 50 is an annular member having an inner diameter greater than or equal to diameters of the cover ventilation opening 43 and the ventilation passage opening part 15a. As shown in FIG. 3, the seal member 50 is disposed to surround the cover ventilation opening 43 so as to be in close contact with the cover plate 41.

Figure 5:
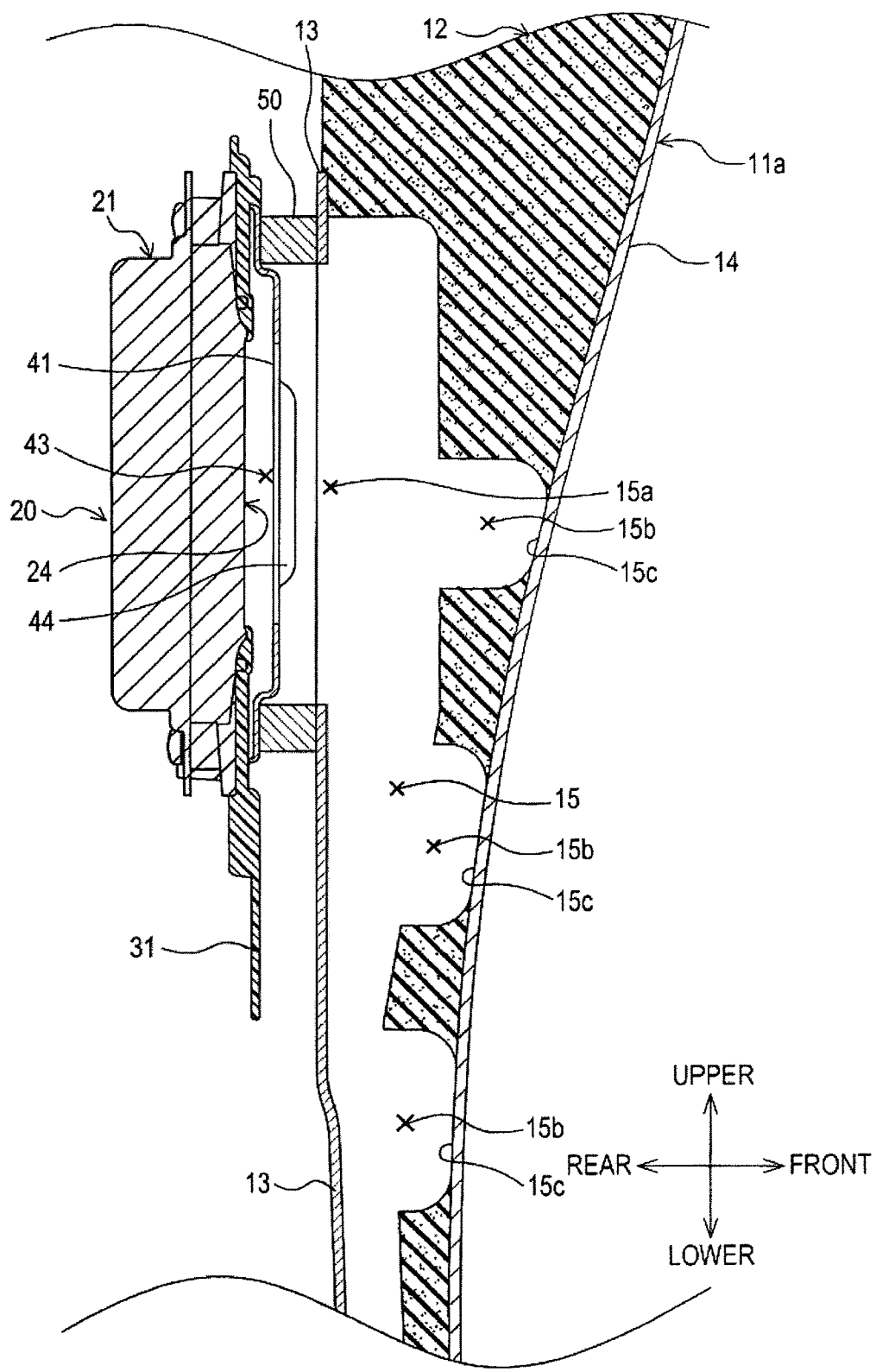
FIG. 5 is a partially sectional view showing a structure of a connection part of the seat back and the air-blowing unit.

Next, a structure in which the air-blowing unit 20 is connected to the ventilation passage 15 in the seat pad 12 such that air can flow therethrough will be described with reference to FIG. 5. As shown in FIG. 5, the groove-shaped ventilation passage 15 extending in a vertical direction is provided in the rear side of the seat pad 12. The opening surface of the ventilation passage 15 in the rear side of the seat pad 12 is covered by the seat pad rear cover 13. In this way, a flowing route of air is formed along the ventilation passage 15. Also, the seat pad rear cover 13 is provided with the ventilation passage opening part 15a which is the circular opening for allowing air to flow therethrough.

A plurality of through passages 15b, which branch from part of the ventilation passage 15 to the front surface of the seat pad 12, are provided in an inner part of the seat pad 12. Further, a plurality of front surface side openings 15c, which are openings leading to the through passages 15b, are provided in the front surface of the seat pad 12. On the front surface of the seat pad 12, a seat cover 14 forming a surface layer of the backrest surface 11a is covered to be in close contact with the seat pad 12. In a position corresponding to at least the front surface side opening 15c, the seat cover 14 has a structure having air permeability that allows air to penetrate through, such as a mesh material or a through hole.

The air-blowing unit 20 is positioned and mounted on a position where the air blower opening 24 and the cover ventilation opening 43 are facing the ventilation passage opening part 15a of the seat pad rear cover 13 by the mounting member 31. More specifically, the air-blowing unit 20 is positioned on a position where the rotation axis of the impeller of the air blower 21, the center of the air blower opening 24, the center of the cover ventilation opening 43, and the center of the ventilation passage opening part 15a are aligned in a straight line in the front-and-rear direction.

The air-blowing unit 20 is supported in a state of being pressed in a direction toward the seat pad rear cover 13 in front of the air-blowing unit 20 via elastic force of the mounting member 31. For this reason, the seal member 50 interposed between the cover plate 41 and the seat pad rear cover 13 is compressed by the cover plate 41 and the seat pad rear cover 13, and is in close contact with and surrounds the cover ventilation opening 43 and the ventilation passage opening part 15a. In this way, the flowing route of air from the air blower opening 24 to the ventilation passage 15 is sealed.

In such a structure, air flows from the front surface side of the seat pad 12 to the rear surface side of the seat pad 12 are generated with the operation of the air blower 21. In this way, air sucked from the front surface side openings 15c via the seat cover 14 can flow in the through passage 15b and the ventilation passage 15 and can be sucked from the air blower opening 24 of the air-blowing unit 20 and then discharged toward the rear side thereof.

Figure 6:
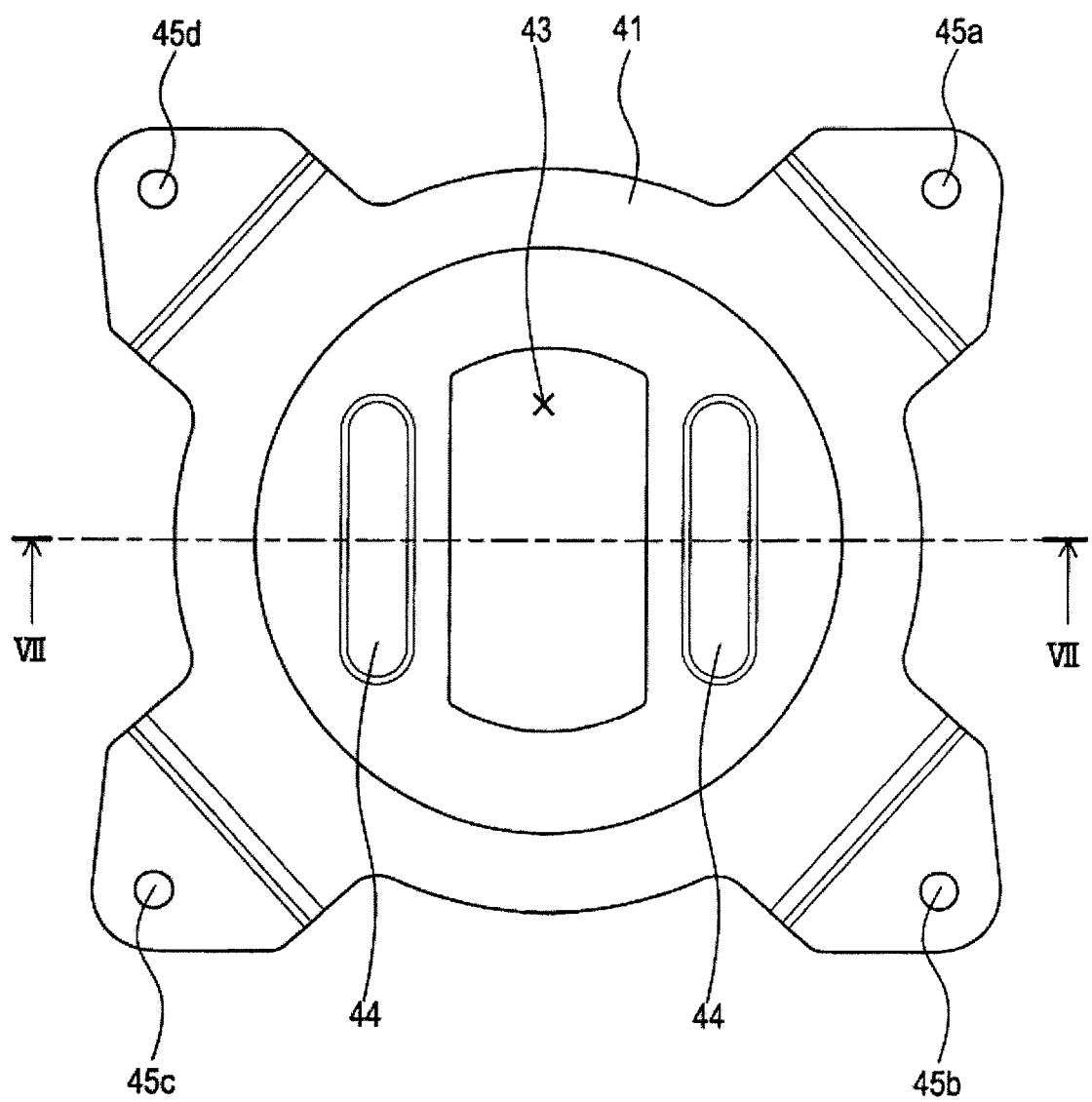
FIG. 6 is a front view of a cover plate.

Next, a characteristic configuration of the cover plate 41 will be described with reference to FIGS. 6 and 7. As shown in FIG. 6, the cover ventilation opening 43 is provided in the central part of the cover plate 41, and is an opening for allowing air to flow therethrough. The cover ventilation opening 43 is an opening area opened to be matched with the center of the air blower opening 24 and bulged at both lengthwise end parts of a rectangle in an arc shape. A diameter in a longitudinal direction of the opening area of the cover ventilation opening 43 is, for example, greater than or equal to that of the air blower opening 24.

Also, a pair of protection parts 44 is provided on both sides in a width direction of the cover ventilation opening 43, and is in a position relationship of sandwiching the cover ventilation opening 43 from both sides. The protection parts 44 have a shape swelled in an elongated linear shape along the longitudinal direction of the cover ventilation opening 43.

Figure 7:
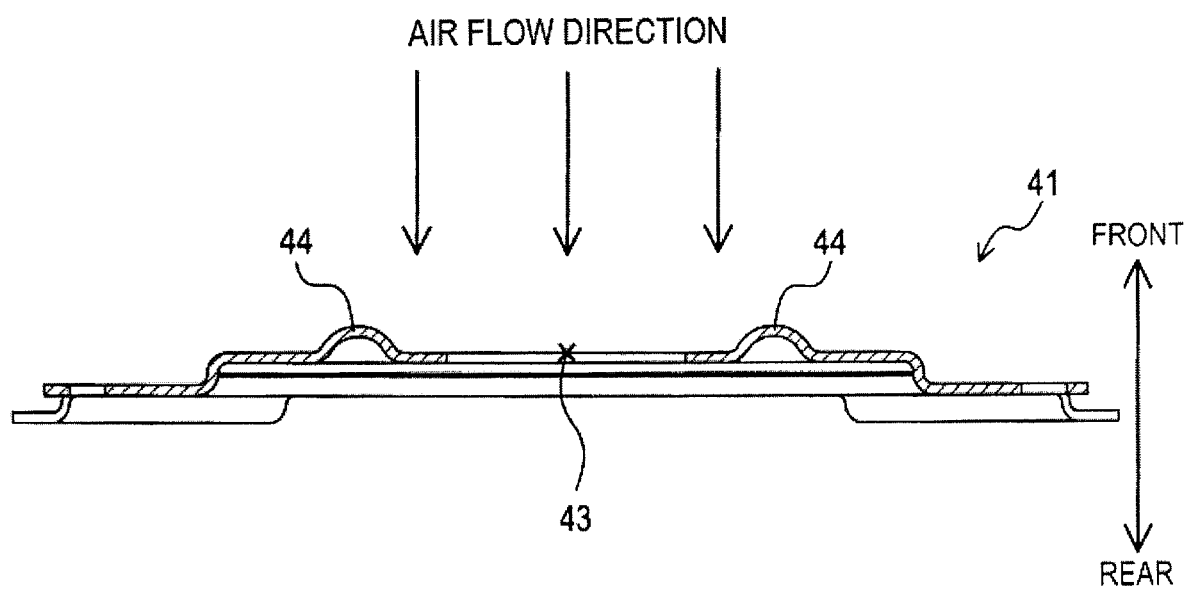
FIG. 7 is a sectional view of the cover plate.

As shown in FIG. 7, a sectional surface of the protection parts 44 is formed into a curved shape protruding toward an upstream side (that is, the seat pad 12 side) of a flowing direction of the air flow generated by the air blower 21. The protection parts 44 are formed into a convex shape, and thus a thickness of the protection parts 44 in the front-and-rear direction of the seat pad 12 increases. Due to the thickness, the separation of the seat pad 12 and the air blower opening 24 can be ensured, and the entering of the foreign matter into the air blower opening 24 can be suppressed effectively.

Next, effects of the air-blowing unit 20 and the seat 1 including the air-blowing unit 20 will be described.

According to the air blower unit 20, it is possible to obtain a vehicle seat air-blowing apparatus that can be arranged such that a duct is not interposed between the seat pad 12 and the air blower 21. By eliminating the duct interposed between the seat pad 12 and the air blower 21, a thickness of the entire air-blowing unit 20 can be decreased. Accordingly, this is advantageous for installing the air-blowing unit 20 in the limited space in the rear side of the seat pad 12.

Further, by disposing the cover plate 41 so as to cover the air blower opening 24 of the air blower unit 20, the air blower 21 can be protected against the local strong load applied from the front side of the seat pad 12. With the cover plate 41, it is also possible to suppress a part of the seat pad 12 from entering into the air blower opening 24, in response to displacement of the seat pad 12 in a direction of the air blower 21 due to the load.

Further, the cover plate 41 is covered on the air blower opening 24 at the position where the center of the cover ventilation opening 43, the center of the air blower opening 24, and the rotation axis of the impeller overlap with each other. Further, the air blower unit 20 is configured to be installed on a position where the center of the cover ventilation opening 43, the rotation axis of the impeller, and the center of the ventilation passage opening part 15a in communication with the ventilation passage 15 in the seat pad 12 overlap with each other. In this manner, it is possible to straighten the flowing route of the air flow from the air blower opening 24 to the ventilation passage 15 without bending. Thus, flowing of the air flow transmitted via the air blower 21 becomes smooth, and noise can be suppressed.

Further, it is possible to improve the air tightness at a connection part of the cover ventilation opening 43 and the ventilation passage 15 by providing the seal member 50 sealing the flowing route of the air flow between the cover ventilation opening 43 and the ventilation passage opening part 15a. It also contributes to buffering between the seat pad 12 and the cover plate 41 and noise reduction.

(Modifications)

(1) In the above embodiment, an example of an air-conditioning mechanism sucking air from the backrest surface 11a by forming air flow toward the rear side of the seat pad 12 from the front side of the seat pad 12 by the air blower 21 has been described. The present disclosure is not limited thereto, and the air-conditioning mechanism may be configured to blow air from the backrest surface 11a by forming air flow toward the front surface side of the seat pad 12 from the rear surface side of the seat pad 12 via the air blower 21.

(2) In the above embodiment, an example of an air-conditioning mechanism including the air-blowing unit 20 in the seat back 11 for supporting a back of an occupant, and allowing air to flow through front and back sides of the seat back 11 has been described. The present disclosure is not limited thereto, and the air-conditioning mechanism may be configured to include an air-blowing unit 20 in a seat cushion for supporting buttocks of an occupant, and allowing air to flow through front and back sides of the seat cushion.

(3) In the above embodiment, an example that the cover plate 41 which is a plate-shaped member is applied as the cover in the present disclosure has been described. The present disclosure is not limited thereto, and a cover of other shapes such as a dome shape may be used.

(4) In the above embodiment, an example that an elongated linear shape is applied to the protection part 44 disposed in the periphery of the cover ventilation opening 43 has been described. The present disclosure is not limited thereto, and the protection part 44 may have, for example, a curved shape or an annular shape surrounding the cover ventilation opening 43. Also, a number of the protection part 44 disposed in the periphery of the cover ventilation opening 43 may be greater than or less than two.

(5) Function of one element in the above embodiments may be allocated to a plurality of elements, or functions of a plurality of elements may be integrated to one element. Also, part of configurations of the above embodiments may be omitted. At least a part of the configurations of each of the above embodiments may be added to, or replaced by a configuration of other embodiments described above. In addition, all aspects included in technical concepts specified by the language described in the claims are embodiments of the present disclosure.

The disclosure provides illustrative, non-limiting examples as follows:

According to a first aspect, there is provided a vehicle seat air-blowing apparatus configured to be attached to a vehicle seat including a seat pad which forms a supporting surface for supporting a body of an occupant and has a ventilation passage configured to allow air to flow therethrough and configured to cause the air to flow in the ventilation passage, the vehicle seat air-blowing apparatus including: an air blower including: an impeller configured to generate air flow; and an air blower opening configured to allow the air flow to flow in the ventilation passage; and a cover provided to the air blower opening and including: a cover ventilation opening configured to allow the air flow to flow therethrough; and a protection part configured to suppress application of a load to the air blower opening, wherein the vehicle seat air-blowing apparatus is configured to be attachable to the vehicle seat along the seat pad at a position where an opening of the ventilation passage provided in a rear surface of the seat pad and the cover ventilation opening of the cover face each other.

According to the above configuration, it is possible to obtain a vehicle seat air-blowing apparatus that can be arranged such that a duct is not interposed between the seat pad and the air blower. By eliminating the duct interposed between the seat pad and the air blower, a thickness of the entire air blower can be decreased. Accordingly, this is advantageous for installing the vehicle seat air-blowing apparatus in a limited space in the rear side of the seat pad. Also, noises caused by flowing of air in the duct can be suppressed.

Meanwhile, since the duct interposed between the seat pad and the air blower is eliminated, there is concern that a local strong load may be applied directly to the air blower from a front side of the seat pad. Accordingly, by disposing a cover so as to cover the air blower opening, the air blower can be protected against the local strong load applied from the front side of the seat pad. With the cover, it is also possible to suppress a part of the seat pad from entering into the air blower opening, in response to displacement of the seat pad in a direction of the air blower due to the load.

According to a second aspect, there is provided the vehicle seat air-blowing apparatus according to the first aspect, wherein the air blower opening is opened in a rotation shaft direction of the impeller, and wherein the cover is disposed to the air blower opening at a position where a center of the cover ventilation opening and a rotation axis of the impeller overlap with each other. According to a third aspect, there is provided the vehicle seat air-blowing apparatus according to the second aspect, wherein the vehicle seat air-blowing apparatus is configured to be attachable to the vehicle seat at a position where the center of the cover ventilation opening, the rotation axis of the impeller, and a center of the opening of the ventilation passage provided in the rear surface of the seat pad overlap with each other.

In this manner, it is possible to straighten a flowing route of the air flow from the air blower opening to the ventilation passage of the seat pad without bending. Thus, flowing of the air flow transmitted via the air blower becomes smooth, and noise can be suppressed.

According to a fourth aspect, there is provided the vehicle seat air-blowing apparatus according to any of the first to third aspects, wherein the protection part is disposed in a periphery of the cover ventilation opening and has a convex shape projecting toward the seat pad. According to a fifth aspect, there is provided the vehicle seat air-blowing apparatus according to the fourth aspect, wherein the projection part includes at least a pair of protection parts, and wherein the cover ventilation opening is disposed between the pair of projection parts.

According to such a configuration, while ensuring an opening suitable for air to flow therethrough, a separation of the seat pad and the air blower opening can be ensured by increasing a thickness toward the seat pad, and thus, the entering of a foreign matter into the air blower opening can be suppressed effectively.

According to a sixth aspect, there is provided the vehicle seat air-blowing apparatus according to any of the first to fifth aspects, further including: an annular seal member interposed between the opening of the ventilation passage provided in the rear surface of the seat pad and the cover ventilation opening and configured to seal a flowing route of the air flow between the opening of the ventilation passage and the cover ventilation opening.

In this manner, it is possible to improve air tightness at a connection part of the ventilation passage of the seat pad and the cover ventilation opening. It also contributes to buffering between the seat pad and the cover and noise reduction.

According to a seventh aspect, there is provided a vehicle seat including: a seat pad which forms a supporting surface for supporting a body of an occupant and has a ventilation passage configured to allow air to flow therethrough; and an air-blowing apparatus which is configured to cause the air to flow in the ventilation passage, the air-blowing apparatus including: an air blower including: an impeller configured to generate air flow; and an air blower opening configured to allow the air flow to flow in the ventilation passage; and a cover provided to the air blower opening and including: a cover ventilation opening configured to allow the air flow to flow therethrough; and a protection part configured to suppress application of a load to the air blower opening, wherein the air-blowing apparatus is attached along the seat pad at a position where an opening of the ventilation passage provided in a rear surface of the seat pad and the cover ventilation opening face each other.

In this way, it is possible to obtain a vehicle seat including the air-blowing apparatus that can be arranged such that a duct is not interposed between the seat pad and the air blower.

What is claimed is:

1. A vehicle seat air-blowing apparatus configured to be attached to a vehicle seat including a seat pad which forms a supporting surface for supporting a body of an occupant and has a ventilation passage configured to allow air to flow therethrough and configured to cause the air to flow in the ventilation passage, the vehicle seat air-blowing apparatus comprising:
   an air blower including:
      an impeller configured to generate air flow; and
      an air blower opening configured to allow the air flow to flow in the ventilation passage; and
   a cover provided to the air blower opening and including:
      a cover ventilation opening configured to allow the air flow to flow therethrough; and
      a protection part configured to suppress application of a load to the air blower opening,
   wherein the vehicle seat air-blowing apparatus is configured to be attachable to the vehicle seat along the seat pad at a position where an opening of the ventilation passage provided in a rear surface of the seat pad and the cover ventilation opening of the cover face each other, and
   wherein the cover is opened at a position where the cover overlaps with a rotation axis of the impeller.

2. The vehicle seat air-blowing apparatus according to claim 1,
   wherein the air blower opening is opened in a rotation shaft direction of the impeller, and
   wherein the cover is disposed to the air blower opening at a position where a center of the cover ventilation opening and a rotation axis of the impeller overlap with each other.

3. The vehicle seat air-blowing apparatus according to claim 2,
   wherein the vehicle seat air-blowing apparatus is configured to be attachable to the vehicle seat at a position where the center of the cover ventilation opening, the rotation axis of the impeller, and a center of the opening of the ventilation passage provided in the rear surface of the seat pad overlap with each other.

4. The vehicle seat air-blowing apparatus according to claim 1,
   wherein the protection part is disposed in a periphery of the cover ventilation opening and has a convex shape projecting toward the seat pad.

5. The vehicle seat air-blowing apparatus according to claim 4,
   wherein the protection part includes at least a pair of protection parts, and
   wherein the cover ventilation opening is disposed between the pair of protection parts.

6. The vehicle seat air-blowing apparatus according to claim 1, further comprising:
   an annular seal member interposed between the opening of the ventilation passage provided in the rear surface of the seat pad and the cover ventilation opening and configured to seal a flowing route of the air flow between the opening of the ventilation passage and the cover ventilation opening.

7. The vehicle seat air blowing apparatus according to claim 6,
   wherein a foremost portion of the seal member is located on a front side of a foremost portion of the protection part.

8. A vehicle seat comprising:
   a seat pad which forms a supporting surface for supporting a body of an occupant and has a ventilation passage configured to allow air to flow therethrough; and
   an air-blowing apparatus which is configured to cause the air to flow in the ventilation passage, the air-blowing apparatus including:
      an air blower including:
         an impeller configured to generate air flow; and
         an air blower opening configured to allow the air flow to flow in the ventilation passage; and
      a cover provided to the air blower opening and including:
         a cover ventilation opening configured to allow the air flow to flow therethrough; and
         a protection part configured to suppress application of a load to the air blower opening,
   wherein the air-blowing apparatus is attached along the seat pad at a position where an opening of the ventilation passage provided in a rear surface of the seat pad and the cover ventilation opening face each other, and
   wherein the cover is opened at a position where the cover overlaps with a rotation axis of the impeller.

9. The vehicle seat according to claim 8, further comprising:
   an annular seal member interposed between the opening of the ventilation passage provided in the rear surface of the seat pad and the cover ventilation opening and configured to seal a flowing route of the air flow between the opening of the ventilation passage and the cover ventilation opening,
   wherein a foremost portion of the seal member is located on a front side of a foremost portion of the protection part.

* * * * *